(12) United States Patent
Parris et al.

(10) Patent No.: US 7,563,835 B2
(45) Date of Patent: Jul. 21, 2009

(54) SOLVENTLESS UNIVERSAL COLORANTS

(75) Inventors: Juanita Parris, Cliffwood, NJ (US); Ning Wu, Edison, NJ (US); Jeannette Simoni-Truncellito, Ridgefield Park, NJ (US); Robert Catena, Belleville, NJ (US); Jitu Modi, Wallington, NJ (US); William P. Keaveney, Pompton Plains, NJ (US); Robert Auerbach, Princeton, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 485 days.

(21) Appl. No.: 10/034,005

(22) Filed: Dec. 28, 2001

(65) Prior Publication Data
US 2003/0187096 A1    Oct. 2, 2003

(51) Int. Cl.
C09D 11/00    (2006.01)

(52) U.S. Cl. .................. 523/161; 523/160; 524/556; 524/577; 524/601; 524/606

(58) Field of Classification Search .......... 524/556, 524/577, 601, 606; 523/160, 161
See application file for complete search history.

(56) References Cited

U.S. PATENT DOCUMENTS

| | | | | |
|---|---|---|---|---|
| 3,846,360 A | * | 11/1974 | Needham | 524/525 |
| 3,846,507 A | * | 11/1974 | Thomm et al. | 525/432 |
| 4,098,741 A | * | 7/1978 | Login | 524/47 |
| 4,112,215 A | * | 9/1978 | Boessler et al. | 528/503 |
| 4,127,422 A | * | 11/1978 | Guzi, Jr. et al. | 524/47 |
| 4,168,180 A | * | 9/1979 | Peabody | 524/577 |
| 4,234,466 A | * | 11/1980 | Takahashi et al. | 523/509 |
| 4,289,678 A | | 9/1981 | Calder et al. | 260/33.6 UA |
| 4,293,475 A | * | 10/1981 | Sidi | 523/410 |
| 4,460,732 A | | 7/1984 | Buscall et al. | 524/460 |
| 4,597,794 A | | 7/1986 | Ohta et al. | 106/20 |
| 4,820,773 A | * | 4/1989 | Alexander et al. | 525/274 |
| 5,062,894 A | | 11/1991 | Schwartz et al. | 106/23 |
| 5,084,573 A | | 1/1992 | Babler et al. | 546/56 |
| 5,095,122 A | | 3/1992 | Bugnon et al. | 548/453 |
| 5,298,076 A | | 3/1994 | Babler | 106/498 |
| 5,347,014 A | | 9/1994 | Babler | 548/453 |
| 5,415,964 A | | 5/1995 | Hayashi et al. | 430/106 |
| 5,476,687 A | * | 12/1995 | Gabriel et al. | 427/435 |
| 5,554,217 A | | 9/1996 | Babler | 106/494 |
| 5,580,933 A | | 12/1996 | Verge et al. | 525/301 |
| 5,648,408 A | | 7/1997 | Babler | 523/333 |
| 5,670,561 A | * | 9/1997 | Scheibelhoffer et al. | 523/351 |
| 5,869,564 A | | 2/1999 | Beach et al. | 524/547 |
| 6,489,382 B1 | | 12/2002 | Giesecke et al. | 524/89 |

FOREIGN PATENT DOCUMENTS

| | | | |
|---|---|---|---|
| EP | 116666 A1 | * | 8/1984 |
| EP | 567229 A1 | * | 10/1993 |
| EP | 0919601 A | | 6/1999 |
| JP | 2103274 A | | 4/1990 |
| JP | 7053612 A | | 2/1995 |
| JP | 7181715 A | | 7/1995 |
| JP | 8143804 A | | 6/1996 |
| JP | 2000281950 A | | 10/2000 |
| JP | 2000290553 A | | 10/2000 |
| WO | EP 0 796 876 A1 | | 9/1997 |

OTHER PUBLICATIONS

ICI United States Inc.; The HLB System—A Time-Saving Guide to Emulsifier Selection; Chapters 1-7, 1976.
Nabar,Prasasd M.; Wetting and Dispersing Agents for Coatings; Paintindia; Jul. 1992, pp. 31-34.
Kaminska E. & Wisniewski R.; Mechanisms of Dispersion of Pigments in Lacquer Binders; International Polymer Science and Technology; vol. 21, No. 8, 1994; pp. T101-T/105.
Conly, Robert F. ;Practical Dispersion: A Guide to Understanding and Formulating Slurries; 1996 VCH Publishers, Inc.; pp. 31-62.

* cited by examiner

*Primary Examiner*—Sanza L McClendon
(74) *Attorney, Agent, or Firm*—Kramer Levin Naftalis & Frankel LLP

(57) ABSTRACT

A method of preparing a universal base composition disclosed which consists of milling a pigment in a resin that is soluble in both water and organic solvent and wherein the resin contains both hydrophobic and hydrophilic monomers such that the total weight of the hydrophobic and hydrophilic monomers is at least about 20% of the total weight of the resin and the weight ratio of hydrophobic monomers to hydrophilic monomers is from about 1/5 to about 5.

64 Claims, No Drawings

SOLVENTLESS UNIVERSAL COLORANTS

FIELD OF THE INVENTION

This invention relates to solventless universal colorants that can be easily letdown in both water and solvent-based dispersions/inks without additional grinding.

BACKGROUND OF THE INVENTION

Printing ink manufacturers produce many surface and laminating flexographic or gravure inks. They are made either by grinding the dry pigments/presscakes into the vehicles, or letting down the waterborne or solventborne bases with appropriate technology varnishes. In the first case, after being mixed into aqueous or solvent-based vehicles in the process of making bases or inks, the dry pigments or presscakes must be further dispersed by grinding. This grinding step generally requires that the pigments be ground for a period of hours using milling equipment, such as a ball mill or an attritor mill. In the second case, a substantial inventory of different bases is required for making different inks. It is thus a great advantage to develop "Solventless Universal Bases" that can be easily letdown into either waterborne or solventborne dispersions/inks without additional grinding. This not only reduces the costly and time-consuming grinding process, but also reduces the inventory cost by using one base for multi-ink systems. Because the solventless base is already well dispersed, the cost may be further reduced by eliminating bad grinding batches and reworks. The freeze/thaw stability problem can also be eliminated due to the solventless nature of the bases. Additionally, the shelf life of the solventless bases is extended dramatically compared to the liquid bases.

Several U.S. Patents (U.S. Pat. Nos. 5,084,573, 5,095,122, 5,298,076, and 5,347,014) described a number of "effect Pigments" that are stir-in pigments which can be added to a coating or ink system without additional grinding. "Effect pigments" are described as inorganic or organic pigments that show metallic, pearlescent and/or silky-luster effects. These patents, however, did not disclose the "non-effect pigments" such as the yellow, magenta, cyan, black process colors. Two other U.S. Patents (U.S. Pat. Nos. 5,554,217 and 5,648,408) described the use of stir-in pigments in the suspension or solution of high molecular weight organic material (coatings or inks). The stir-in pigments were prepared by the wet-milling process and contain organic pigments, inorganic fillers and additives such as texture-improving agents. The stir-in pigments in these two patents were intended for use in organic systems instead of water-based systems. None of them is prepared by a hot melt dispersion process. Commercially available solventless bases or pigment chips are based on acrylics, SMA and nitrocellulose (Product Brochures of Knight Colors, KVK USA, Penn Colors, RHB Dispersions). None of these commercially available pigment chips can be used in both solvent and water-based systems. None of the patents or literature disclosed the effect of resin hydrophilicity and hydrophobicity balance on the performance of solventless colorants. In addition, the preferred resins disclosed in this invention record provide dramatically improved pigment dispersion characteristics and improve the overall pigment efficiency. Compared to other resins, the preferred resins permit manufacturing of inks or coatings at lower pigment content but with improved color characteristics.

SUMMARY OF THE INVENTION

The present invention provides a method of preparing a universal base composition comprising dispersing a pigment in a resin that is soluble in both water and organic solvent and wherein: (a) said resin comprises both hydrophobic and hydrophilic monomers; (b) the total weight of the hydrophobic and hydrophilic monomers is at least about 20% of the total weight of the resin; and (c) the weight ratio of hydrophobic monomers to hydrophilic monomers is from about 1/5 to about 5.

The present invention also provides a universal base composition comprising a pigment and a resin that is soluble in both water and organic solvent, wherein:(a) said resin comprises both hydrophobic and hydrophilic monomers;(b) the total weight of the hydrophobic and hydrophilic monomers is at least about 20% of the total weight of the resin; and (c) the weight ratio of hydrophobic monomers to hydrophilic monomers is from about 1/5 to about 5.

Other objects and advantages of the present invention will become apparent from the following description and appended claims.

DETAILED DESCRIPTION OF THE INVENTION

It has now been found that a universal base composition is prepared by dispersing a pigment in a resin that is soluble in both water and organic solvent and wherein the resin contains both hydrophobic and hydrophilic monomers such that the total weight of the hydrophobic and hydrophilic monomers is at least about 20% of the total weight of the resin and the weight ratio of hydrophobic monomers to hydrophilic monomers is from about 1/5 to about 5.

A universal base composition is defined for the purpose of this invention as a composition containing a pigment and a resin that can be easily letdown into solvent or waterborne dispersions/inks without additional grinding.

A Hydrophilic monomer is defined for the purpose of this invention as a monomer that, after being made into a polymer, contains at least one functional group that impart the solubility in both water and solvent (lower alcohol and lower alcohol/acetate mixtures). Such functional groups include but are not limited to —COOH, —OH, —PEO, —NH$_2$, —SO$_3$H, piperazine, pyrrolidone.

Examples of hydrophilic monomers include but are not limited to 2,2-dimethylol propionic acid; trimethylol propane; 2,2-dimethylol-1,3-propanediol; acrylic acid; triethylene glycol; glycerol; pentaerythritol; 2,2-dimethylol butanoic acid; methacrylic acid; trimellitic anhydride; methyl hydroxylacrylate; ethyleneglycol monomethacrylate; piperazine; maleic anhydride; vinyl alcohol; and vinyl pyrrolidone Hydrophobic monomer is defined for the purpose of this invention as a monomer that contains paraffinic chain with at least six carbon atoms, or contains hydrocarbon ring with at least 8 carbon atoms. Furthermore, a hydrophobic monomer, after being made into a polymer, does not contain the functional groups that impart solubility in both water and solvent (lower alcohol and lower alcohol/acetate mixtures).

Examples of hydrophobic monomers include but are not limited to tetrahydrophthalic anhydride; dimer diol; styrene; -methyl styrene; isophoronediamine; dimer acid; diphenyl-methane-4,4'-diisocyanate; bisphenol A; 1,6-hexanediol; sebacic acid; azelaic acid; stearic acid; octanoic acid; hexamethylene diamine; isobornyl methacrylate; and 2-methyl-1,5-pentanediamine The inks based on these universal base compositions can be printed by flexo and gravure processes, for surface or laminating application. The inks based on these universal base compositions can also be used as jet inks due to their extremely fine particle size and excellent stability of the pigment particles.

Essential components of the universal base composition in the present invention are resins that have good solubility in both water and solvent (alcohol/ester). Typical resins in this invention have either acid or amine functionality for good solubility in both water and solvents. Acid values of the typical resins in this invention range from about 0 to about 300, preferably about 30 to about 250. Amine values of the typical resins (polyamide, e.g.) in this invention range from about 0 to about 400, preferably about 150 to about 380. The softening point of the resins can range from 20° C. to 200° C. The molecular weight of the resin typically ranges from 500 to 1,000,000.

The resins should also possess appropriate hydrophilicity and hydrophobicity balance (HLB) to be effective pigment dispersants. Hydrophobic groups adsorb onto the pigment surface as anchors (adsorption property), while hydrophilic groups are solvated in water or alcohol/acetate and stabilize pigment particles by either steric or electrostatic stabilization. Both the hydrophobic and hydrophilic groups are important for particle stabilization and an appropriate HLB can result in good solubility, rheological and optical properties. If either the adsorption property or steric/electrostatic repulsion force is not sufficient, the solventless colorants may not be soluble in desired solvent (s). At intermediate levels of adsorption property and steric/electrostatic repulsion force, the pigment particles can become flocculated and bridged, resulting in a more thixotropic dispersion which is manifested by weaker color strength.

Resins with the above properties include, but are not limited to, polyesters, acrylics, polyurethanes, polyamides and copolymers such as urethane-amides, urethane-esters.

The universal base compositions can be prepared using a hot melt grinding process, which involves grinding pigments or presscakes in softened or molten resins under a high shearing force, with or without additives. Upon cooling, the universal base composition can be obtained. The hot melt grinding processes include, but are not limited to, sigma-blade mixing (Brabender, Baker Perkins, e.g.) and single-screw or twin-screw extrusion. The universal base composition may also be prepared by grinding the pigments/presscakes in the presence of resin/solvents, then driving off the solvents.

The resultant solventless universal base composition can be letdown into: 1) water or solvent-based dispersions with water (ammonical water, if necessary) or solvent; 2) water or solvent-based inks with water or solvent-based technology varnishes; 3) water or solvent-based inks with water or solvent alone. The letdown process involves only low-energy mixing. No additional pigment grinding is required. The inks and dispersions possess ultra-fine particle size, narrow particle size distribution, and possess superior color strength, gloss and transparency characteristics compared to conventionally prepared dispersions/inks. The inks can be printed with flexographic, gravure or ink jet processes, for either surface or laminating application. The performance of the inks can be modified by the addition of suitable technology varnishes (resins/additives/solvents) in order to meet the requirements of the end use applications.

EXAMPLE 1

Preparation of Universal Base Compositions

I) Solventless Universal Base Composition 1 (UB1):
UB1 is composed of the following:

| | |
|---|---|
| 50 g | Phthalo blue pigment 15:4 (Daicolor Pope) |
| 50 g | Polyamide resin (Amine #: 360, $MW_w$: 3500, Softening point: 30° C.) (Piperazine (Huntsman Chemical)/Ethyl Acrylate (Rohm & Haas)/Dytec A (Dupont), Moloar ratio: 1/2/1) |

The above polyamide resin (50 g) is added into the steam-heated Brabender (100° C.) and mixed at low speed (~20 RPM) until all the resin was melted. The Blue pigment 15:4 (50 g) is then slowly added in a period of 30 minutes while mixing. The mixing at 100 RPM is continued for another two hours after which the solventless composition is discharged and cooled down. The universal base composition in powder-form is then obtained by grinding with an Osterizer.

II) Universal Base Composition 2 (UB2):
UB2 is composed of the following:

| | |
|---|---|
| 50 g | Phthalo blue pigment 15:4 (Daicolor Pope) |
| 50 g | Polyester (Acid #: 80, $MW_W$: 5000, Softening point: 85° C.) (Trimethylol Propane (Perstorp)/2,2-Dimethylol Propionic acid (Trimet Technical Product)/ Tetrahydrophthalic Anhydride (Lonza), Molar ratio: 4.9/1.0/4.2) |

The above polyester resin (50 g) is added into the steam-heated Brabender (100° C.) and mixed at low speed (~20 RPM) until all the resin was melted. The Blue pigment 15:4 (50 g) is then added slowly in a period of 30 minutes while mixing. The mixing at 100 RPM is continued for another two hours after which the solventless composition is discharged and cooled down. The universal base composition in powder-form is then obtained by grinding with an Osterizer.

III) Universal Base Composition 3 (UB3):
UB3 is composed of the following:

| | |
|---|---|
| 50 g | Phthalo blue pigment 15:4 (Sun Chemical Color Group) |
| 50 g | Polyurethane (Acid #: 69, $MW_W$: 5800, Softening point: 120° C.) (Toluene Diisocyanate (Bayer)/2,2-Dimethylol Butanoic acid (Mitsubishi)/Dimer Diol 1075 (Henkel)/2-methyl-1,3-propanediol (Arco), Molar ratio: 0.95/0.36/0.07/0.42) |

The above polyurethane resin (50 g) and pigment 15:4 (50 g) are mixed together. At 200 RPM, the mixture is passed through a twin screw extruder which is preset at 260° F. The product is then cooled down. The universal base composition in powder-form is then obtained by grinding with an Osterizer.

IV) Universal Base Composition 4 (UB4):
UB4 is composed of the following:

| | |
|---|---|
| 50 g | Phthalo blue pigment 15:4 |
| 40 g | Acrylics (Acid #: 238, $MW_W$: 1700, Softening point: 105° C.) |
| | (Joncryl 683, S. C. Johnson) |
| 10 g | Propylene Glycol |

The above acrylics resin (40 g) is added into the steam-heated Brabender at 110° C. It is then mixed at low speed (~20 RPM) while slowly adding propylene glycol (10 g) until all the resin was melted. Then, the Blue pigment 15:4 (50 g) is slowly added in a period of 30 minutes while mixing. The mixing is continued at 100 RPM for another two hours after which the resulting solventless composition is cooled down. The universal base composition in powder-form is then obtained by grinding with an Osterizer.

V) Universal Base Composition 5 (UB5):
UB5 is composed of the following:

| | |
|---|---|
| 157 g | Phthalo blue pigment 15:4 presscake (35% solid) |
| | (Sun Chemical Color Group) |
| 45 g | Polyurethane (Acid #: 42, $MW_W$: 6000, Softening point: 120° C.) |
| | (Toluene Diisocyanate (Bayer)/2,2-Dimethylol Butanoic acid (Mitsubishi)/Dimer Diol 1075 (Henkel)/2-methyl-1,3-propanediol (Arco), Molar ratio: 0.95/0.25/0.12/0.48) |

The polyurethane resin (45 g) is mixed with the blue presscake (57 g) in the Brabender at room temperature. The Brabender temperature is then increased to 190° F. and mixing is resumed at 100 RPM until water breaks and becomes clear. The mixing speed is then lowered to 40 RPM and water is removed with a pipette. More presscake (50 g) is added, the mixing speed is increased to 100 RPM and the above procedure is repeated. Then more presscake (50 g) is added and the above procedure is repeated once more. The temperature is then increased to 220° F. and vacuum is applied while mixing continues. The vacuum is stopped and flush is checked every 3 minutes until the flush is dry (no more steam out). This takes about ~10 minutes. Then, the resulting solventless composition is discharged and cooled down to room temperature. The universal base composition in powder-form can then be obtained by grinding with an Osterizer.

VI) Universal Base Composition 6 (UB6):
UB6 is composed of the following:

| | |
|---|---|
| 180 g | Red pigment 52:1 presscake (25% solid) |
| | (Sun Chemical Color Group) |
| 50 g | Polyurethane (Acid #: 42, $MW_W$: 6000, Softening point: 120° C.) |
| | (Toluene Diisocyanate (Bayer)/2,2-Dimethylol Butanoic acid (Mitsubishi)/Dimer Diol 1075 (Henkel)/2-methyl-1,3-propanediol (Arco), Molar ratio: 0.95/0.25/0.12/0.48) |
| 5 g | Solsperse 24000 |
| | (Avecia) |

The polyurethane resin (50 g), Solsperse 24000 (5 g) and the red presscake 52:1 (60 g) are mixed in the Brabender at room temperature. The Brabender temperature is increased to 190° F. and the mixing is continued at 100 RPM until water breaks and becomes clear. The mixing speed is lowered to 40 RPM and water is removed with a pipette. Additional presscake (60 g) is added, the mixing speed is increased to 100 RPM and the above procedure is repeated. More presscake (60 g) is then added and the above procedure is repeated once more. The temperature is then increased to 220° F. and vacuum is applied while mixing continues. The vacuum is then stopped and flush is checked every 3 minutes until the flush is dry (no more steam out). This takes about ~10 minutes. Then, the resulting solventless composition is discharged and cooled down to room temperature. The Universal base composition in powder-form can then be obtained by grinding with an Osterizer.

VII) Universal Base Composition 7 (UB7):
UB7 is composed of the following:

| | |
|---|---|
| 130 g | Yellow pigment 14 presscake (38.5% solid) |
| 50 g | Polyurethane (Acid #: 42, $MW_W$: 6000, Softening point: 120° C.) |
| | (Toluene Diisocyanate (Bayer)/2,2-Dimethylol Butanoic acid (Mitsubishi)/Dimer Diol 1075 (Henkel)/2-methyl-1,3-propanediol (Arco), Molar ratio: 0.95/0.25/0.12/0.48) |

The polyurethane resin (50 g) and the yellow presscake 14 (50 g) are mixed in the Brabender at room temperature. The Brabender temperature is increased to 190° F. and mixed at 100 RPM until water breaks and becomes clear. The mixing speed is lowered to 40 RPM and water is removed with a pipette. Additional presscake (40 g) is added and the mixing speed is increased to 100 RPM and the above procedure is repeated. Then more presscake (40 g) is added and the above procedure is repeated once more. Then the temperature is increased to 220° F. and vacuum is applied while mixing is continued. The vacuum is stopped and flush is checked every 3 minutes until the flush is dry (no more steam out). This takes about ~10 minutes. Then, the resulting solventless composition is discharged and cooled down to room temperature. The universal base composition in powder form is obtained by grinding with an Osterizer.

VIII) Universal Base Composition 8 (UB8):
UB8 is composed of the following:

| | |
|---|---|
| 182 g | Yellow pigment 14 presscake (38.5% solid) |
| 30 g | Polyurethane (Acid #: 42, $MW_W$: 6000, Softening point: 120° C.) |
| | (Toluene Diisocyanate (Bayer)/2,2-Dimethylol Butanoic acid (Mitsubishi)/Dimer Diol 1075 (Henkel)/2-methyl-1,3-propanediol (Arco), Molar ratio: 0.95/0.25/0.12/0.48) |

The polyurethane resin (30 g) is mixed with yellow presscake 14 (62 g) in the Brabender at room temperature. The Brabender temperature is then increased to 190° F. Mixing is carried out at 100 RPM until water breaks and becomes clear. The mixing speed is then lowered to 40 RPM and water is removed with a pipette. Additional presscake (60 g) is added and the mixing speed is increased to 100 RPM and the above procedure is repeated. More presscake (60 g) is then added and the above procedure is repeated once more. Then, the temperature is increased to 220° F. and vacuum is applied while mixing continues. Vacuum is stopped and flush is checked every 3 minutes until the flush is dry (no more steam out). This takes about ~10 minutes. The resulting solventless composition is discharged and cooled down to room temperature. The universal base composition in powder form is then obtained by grinding with an Osterizer.

IX) Universal Base Composition 9 (UB9):
UB9 is composed of the following:

| | |
|---|---|
| 60 g | White pigment TiO$_2$ (Dupont) |
| 40 g | Polyurethane (Acid #: 42, MW$_W$: 6000, Softening point: 120° C.) (Toluene Diisocyanate (Bayer)/2,2-Dimethylol Butanoic acid (Mitsubishi)/Dimer Diol 1075 (Henkel)/2-methyl-1,3-propanediol (Arco), Molar ratio: 0.95/0.25/0.12/0.48) |

The above polyurethane resin (40 g) is added into the steam-heated Brabender at 100° C. and mixed at low speed (~20 RPM) until all the resin is melted. The White pigment TiO$_2$ (60 g) is slowly added in a period of 30 minutes while mixing. The mixing is continued at 100 RPM for another hour after which mixing is stopped and the resulting solventless composition mixture is discharged and cooled down. The universal base composition in powder form is then obtained by grinding with an Osterizer.

X) Universal Base Composition 10 (UB10):
UB10 is composed of the following:

| | |
|---|---|
| 157 g | Phthalo blue pigment 15:4 presscake (35% solid) |
| 45 g | Polyurethane (Acid #: 45, MW$_W$: 6000, Softening point: 107° C.) (Toluene Diisocyanate (Bayer)/2,2-Dimethylol Butanoic acid (Mitsubishi)/Dimer Diol 1075 (Henkel)/2-methyl-1,3-propanediol (Arco), Molar ratio: 0.95/0.25/0.02/0.58) |

The polyurethane resin (45 g) is mixed with blue presscake (57 g) in the Brabender at room temperature. The Brabender temperature is then increased to 190° F. Mixing is then carried out at 100 RPM until water breaks and becomes clear. The mixing speed is then lowered to 40 RPM and water is removed with a pipette. Additional presscake (50 g) is added and the mixing speed is increased to 100 RPM and the above procedure is repeated. More presscake (50 g) is added and the above procedure is repeated once more. The temperature is increased to 220° F. and vacuum is applied while mixing continues. Vacuum is then stopped and flush is checked every 3 minutes until the flush is dry (no more steam out). This takes about ~10 minutes. Then, the resulting solventless composition is discharged and cooled down to room temperature. The universal base composition in powder form is then obtained by grinding with an Osterizer.

XI) Universal Base Composition 11 (UB11):
UB12 is composed of the following:

| | |
|---|---|
| 157 g | Phthalo blue pigment 15:4 presscake (35% solid) (Sun Chemical Color Group) |
| 45 g | Polyamide (Acid #: 41, MW$_W$: 6000, Softening point: 143° C.) (Azelaic acid (Emerox 1144, Dock)/Diacid 1550 (Westvaco)/Isophoronediamine (Aldrich), Molar ratio: 0.49/0.12/0.53) |

The polyamide resin (45 g) is mixed with blue presscake (57 g) in the Brabender a room temperature. The temperature of the Brabender is then increased to 190° F. Mixing is then carried out at 100 RPM until water breaks and becomes clear. The mixing speed is lowered to 40 RPM and water is removed with a pipette. Additional presscake (50 g) is then added and the mixing speed is increased to 100 RPM and the above procedure is repeated. More presscake (50 g) is then added and the above procedure is repeated once more. The temperature is increased to 220° F. and vacuum is applied while mixing continues. Vacuum is then stopped and flush is checked every 3 minutes until the flush is dry (no more steam out). This takes about ~10 minutes. The resulting solventless composition is discharged and cooled down to room temperature. The universal base composition in powder form is then obtained by grinding with an Osterizer.

EXAMPLE 2

Preparation of Liquid Dispersions from Universal Bases

Water or solvent-based dispersions were prepared by adding ammonical water or solvent into the above solventless bases, followed by shaking with the Red-devil Paint Shaker or mixing by high speed mixer until the solventless bases were fully dissolved.

I) Preparation of Water-based Dispersions:

Dispersion 1w:
UB1 (40 g) was added into ammonical water (60 g, 3% NH$_4$OH). The mixture was shaken with Red-devil Paint shaker for 2 hours. The grind was checked and a "0" reading on the NPIRI grind gage indicates the base is fully dissolved and a good dispersion is achieved.

Dispersions 2w-11w (w Indicates Water-Based):
UBs 2-10 were dissolved using the same procedure as Dispersion 1w.

UBs 2-9 were fully dissolved. However, UB10 is not dissolvable in ammoniacal water. The total weight of the hydrophobic and hydrophilic monomers for the resin used in UB10 is 18.2% of the total weight of the resin (see Table 2), which is less than the desired minimum of 20%.

UB11 is not dissolvable in ammoniacal water. The weight ratio of the hydrophobic monomer to hydrophilic monomer for the resin used in UB11 is 15.7 (see Table 2) which is out of the desired range of ⅕ to 5.

II) Preparation of Solvent-based Dispersions:

Dispersion 1s (s Indicates Solvent Based):
UB1 (50 g) was added into the solvent blend n-propanol/n-propyl acetate (50 g, 50/50 blend) and mixed with high-speed mixer for 20 minutes. The grind was checked and a "0" reading on NPIRI grind gage indicates the base is fully dissolved and a good dispersion is achieved.

Dispersions 2s-10s:
UBs 2-10 were dissolved using the same procedure as Dispersion 1s.

UBs 2-9 were fully dissolved. However, UB10 is not dissolvable. The total weight of the hydrophobic and hydrophilic monomers for the resin used in UB10 is 18.2% of the total weight of the resin (see Table 2), which is less than the desired minimum of 20%.

UB 11 is fully dissolved, but the dispersion based on it is ~40% weaker than UB5, that means the polyamide used in UB11 is not an effective pigment dispersant. Also, UB11 is not dissolvable in ammoniacal water. So UB11 is not dissolvable in both water and solvent. The weight ratio of the hydrophobic monomer to hydrophilic monomer for the resin used in UB11 is 15.7 (see Table 2), which is out of the desired range of 1/5 to 5.

Particle Size and Distribution

Particle size and distribution was characterized by Microtrac Particle Size Analyzer (light-scattering technique) for the above liquid dispersions based on the solventless bases, and traditional commercial dispersions. The dispersions based on solventless bases possess smaller particle size and narrower size distribution compared to the traditional commercial dispersions, as shown in Table 1. Smaller particle size can result in better color strength, gloss and transparency of the final ink films.

TABLE 1

Comparison in Particle Size and Distribution

|  | Mean particle size (μm) | Standard deviation |
|---|---|---|
| Dispersion 1w | 0.19 | 0.07 |
| Dispersion 2w | 0.17 | 0.07 |
| Dispersion 3w | 0.15 | 0.06 |
| AX ™ blue base* | 0.35 | 0.31 |
| Dispersion 5s | 0.28 | 0.13 |
| ULTRABOND ™ Blue** | 0.31 | 0.18 |
| ROTOMAX ™ Blue** | 0.90 | 0.55 |
| Dispersion 6s | 0.36 | 0.12 |
| ULTRABOND ™ Red** | 0.53 | 0.28 |
| ROTOMAX ™ Red** | 0.99 | 0.64 |
| Dispersion 8s | 0.22 | 0.11 |
| ULTRABOND ™ yellow** | 0.75 | 0.29 |
| ROTOMAX ™ yellow** | 0.55 | 0.79 |

*Sun Chemical Internal water-based blue base
**Sun Chemical solvent-based commercial inks The following Table 2 summarizes the properties of each resin synthesized as well as their abilities to make a universal base.

EXAMPLE 3

Ink Formulation and Performance

Water or solvent-based surface/laminating inks were prepared by letting down solventless universal colorants with varnishes as indicated below.

Ink 1: A solvent-based gravure laminating ink is composed of the following

| Universal base UB3 | 22.0 |
|---|---|
| ROTOMAX ™ varnish | 10.0 |
| n-propanol | 22.0 |
| n-propyl acetate | 46.0 |
|  | 100.0 |

UB3 (22 g) was added to a solvent blend containing n-propanol (22 g) and n-propyl acetate (22 g) and shaken in Red-devil Paint Shaker for 1 hour. ROTOMAX™ varnish (10 g) and n-propyl acetate (24 g) were then added to the resulting dispersion and mixed with lab mixer for 15 minutes resulting in Ink 1.

Ink 2: A water-based flexo laminating ink is composed of the following:

| Universal base UB3 | 32.0 |
|---|---|
| DPF426 ™ Letdown Varnish | 13.0 |
| Water | 49.5 |
| n-propanol | 3.0 |
| Surfynol 104PA | 1.0 |
| Ammonium Hydroxide | 1.5 |
|  | 100.0 |

UB3 (32 g) was added to a mixture of water (49.5 g), n-propanol (3 g) and Ammonium Hydroxide (1.5 g) and shaken in Red-devil Paint Shaker for 1 hour. Letdown Varnish (13 g) and surfynol 104PA (1 g) were then added to the resulting dispersion and mixed with lab mixer for 15 minutes resulting in Ink 2.

TABLE 2

Summary of Properties of resins UB1-11

| Resin | Hydrophilic group wt % | Hydrophobic group wt % | Acid # | Amine # | MWw | Tsoft ($O_C$) | Universal? |
|---|---|---|---|---|---|---|---|
| UB1 (polyamide) | 27.2 | 23.1 | 0 | 360 | 3500 | 30 | YES |
| UB2 (polyester) | 18.8 | 43.6 | 80 | 05000 | 85 |  | YES |
| UB3 (polyurethane) | 17.9 | 11.7 | 69 | 05800 | 115 |  | YES |
| UB4 (acrylics) | 22.9 | 77.1 | 238 | 01700 | 105 |  | YES |
| UB5-UB9 (polyurethane) | 12.2 | 20.7 | 42 | 0 | 6000 | 120 | YES |
| UB10 (polyurethane) | 14.1 | 4.0 | 45 | 0 | 6000 | 107 | NO |
| UB11 (polyamide) | 6.0 | 94.0 | 41 | 0 | 6000 | 143 | NO |

Ink 3: A solvent-based flexo surface ink is composed of the following:

| | |
|---|---|
| Universal base UB3 | 18.0 |
| SUNTEX ™ Varnish TV93-5467 | 33.0 |
| n-propanol | 16.0 |
| n-propyl acetate | 33.0 |
| | 100.0 |

UB3 (18 g) was added to a mixture that contains n-propanol (16 g, n-propyl acetate (33 g) and SUNTEX™ TV93-5467 (33 g) and shaken in Red-devil Paint Shaker for 1 hour resulting in Ink 3.

Ink 4: A water-based flexo surface ink is composed of the following:

| | |
|---|---|
| Universal base UB3 | 30.0 |
| HYDROPOLY ™ varnish TV88-3131 | 22.0 |
| Water | 42.5 |
| n-propanol | 3.0 |
| Surfynol 104PA | 1.0 |
| Ammonium Hydroxide | 1.5 |
| | 100.0 |

UB3 (30 g) was added to a mixture of water (42.5 g), n-propanol (3 g) and ammonia hydroxide (1.5) and shaken in Red-devil Paint Shaker for 1 hour. Then HYDROPOLY™ Varnish TV88-3131 (22 g) and Surfynol 104PA (1 g) were added to the resulting dispersion and mixed with lab mixer for 15 minutes resulting in Ink 4.

Ink 5: A solvent-based gravure blue laminating ink is composed of the following:

| | |
|---|---|
| Polyurethane Solution (940-1007) | 24.0 |
| SS NC Varnish (3-V-7) | 3.0 |
| Syloid 161 (18-321) | 1.0 |
| Universal Base UB5 | 18.6 |
| Water | 2.0 |
| Ethanol | 7.0 |
| n-propyl acetate | 44.4 |
| | 100.0 |

A varnish was prepared by mixing n-propyl acetate (44.4 g), ethanol (7 g), water (2 g), Syloid 161 (1 g), SS NC Varnish (3 g) and Polyurethane solution 940-1007 (24 g). UB5 (18.6 g) was then added into the above varnish, and mixed with high speed mixer at 3000 RPM for 20 minutes resulting in Ink 5.

Ink 6: A solvent-based flexo blue laminating ink is composed of the following:

| | |
|---|---|
| Universal Base UB5 | 30.0 |
| Polyurethane solution 940-1007 | 31.3 |
| Polyurethane solution 940-1 | 5.0 |
| Tyzor GBA | 2.0 |
| Syloid 161 | 1.0 |
| n-propanol | 25.7 |
| n-propyl acetate | 2.5 |
| ethanol | 2.5 |
| | 100.0 |

A varnish was prepared by mixing n-propanol (25.7 g), n-propyl acetate (2.5 g), ethanol (2.5 g), Syloid 161 (1 g), Tyzor GBA (2 g), Polyurethane 940-1 (5 g) and Polyurethane 940-1007 (31.3 g). UB5 (30 g) was then added into the above varnish and mixed with high-speed mixer at 3000 RPM for 20 minutes resulting in Ink 6.

Ink 7: A solvent-based gravure red laminating ink is composed of the following:

| | |
|---|---|
| Polyurethane Solution (940-1007) | 20.0 |
| Tyzor GBA Organic Titanate | 2.0 |
| Syloid 161 (18-321) | 1.4 |
| Universal Base UB6 | 21.0 |
| Water | 1.9 |
| Ethanol | 21.3 |
| n-propyl acetate | 32.4 |
| | 100.0 |

A varnish was prepared by mixing n-propyl acetate (32.4 g), ethanol (21.3 g), water (1.9 g), syloid 161 (1.4 g), Tyzor GBA Organic Titanate (2 g) and Polyurethane solution 940-1007 (20 g). UB6 (21 g) was then added into the above varnish and mixed with high speed mixer at 3000 RPM for 20 minutes resulting in Ink 7.

Ink 8: A solvent-based flexo red laminating ink is composed of the following:

| | |
|---|---|
| Universal Base UB6 | 33.3 |
| Sun Internal Polyurethane 94-1007 | 29.3 |
| Sun Internal Polyurethane 940-1 | 2.2 |
| Tyzor GBA | 2.0 |
| Syloid 161 | 1.0 |
| n-propanol | 20.0 |
| n-propyl acetate | 11.1 |
| Ethanol | 1.1 |
| | 100.0 |

A varnish was prepared by mixing n-propanol (20 g), n-propyl acetate (11.1 g), ethanol (1.1 g), Syloid 161 (1 g), Tyzor GBA (2 g), Polyurethane 940-1 (2.2 g) and Polyurethane 940-1007 (29.3 g). UB6 (33.3 g) was then added into the above varnish and mixed with high speed mixer at 3000 RPM for 20 minutes resulting in Ink 8.

The performance of these inks was compared to the corresponding commercial inks according to the following procedures. Briefly, drawdowns of experimental and standard inks were made side by side on various films with a 165 anilox handproofer, dried at 80° C. for 10 seconds. Then, the following tests were performed:

Crinkle resistance: The film with the side by side drawdown was held with both hands and then crinkled in a rotating motion. The ink film was then observed for damages. This test examines flexibility of the ink films.

Water/ammonia resistance: A drop of water or ammonical water (pH=9.0) was put simultaneously on the experimental and standard ink films, and then wiped off in 10 seconds with a kimwipe. The print and kimwipe were observed for ink removal.

610 tape adhesion: With firm pressure a 610 tape was adhered on the ink film in the cross direction. After 5 seconds, the print was held with one hand and quickly the tape was pulled off the print at a 45 degree angle to the prints. The print was then observed for ink removal.

Scratch resistance: The side by side print was scratched with fingernail in a cross direction. The ink film was observed for damage.

Gloss: The ink film gloss was measured with BYK Gardner Glossmeter (Model 4520).

Color Strength: The color strength was measured with Data-Color SF600Plus Spectrophotometer.

Transparency: The side by side print for was visually observed for transparency comparison.

Resolubility: Side by side drawdowns were made on the NPIRI Grind Gage for the standard and experimental inks and allowed to dry. A drop of PH9 ammonical water was put simultaneously (solvent blend used in the ink in case of solvent-based ink) over the two ink films. The ink was observed for resolubilization. The test examines the ability of the dry ink to resolubilize in the presence of solvent. An ink with unacceptable resolubility will dry on the cylinder or printing plate thereby hurting ink printability.

Extrusion Lamination Bond Strength: Side by side prints on appropriate films were made with 165 anilox handproofer and dried at 80° C. for 10 seconds. A thin layer of primer was applied over the print with a 360-anilox handproofer and then dried at 80° C. for 10 seconds. A polyethylene film was then laminated over the print with a Hot Roll Laminator at 300° F. Then, the bond strength was determined by pulling the laminated structure with Instron Tensile Tester. This test examines the adhesion and cohesion of the laminated inks.

Adhesive Lamination Bond Strength: Side by side prints on appropriate films were made with 165 anilox handproofer and dried at 80° C. for 10 seconds. A thin layer of adhesive was then applied over the print with a 360-anilox handproofer and dried at 80° C. for 10 seconds. A polyethylene film was laminated over the print with a Hot Roll Laminator at 150° F. The bond strength was determined by pulling the laminated structure with Instron Tensile Tester. This test examines the adhesion and cohesion of the laminated inks.

The results of the performance of these inks are shown in Tables 3-10. Due to the fine particle size and narrow size distribution, the inks based on the solventless universal colorants possess superior gloss, color strength and transparency compared to the corresponding commercial inks. In addition, these inks possess good printability, adhesion, laminating bond strength and other resistance properties.

TABLE 3

Comparison of Ink 1 with Commercial ROTOMAX ™ Blue (Solvent-based Gravure Laminating Ink)

| Properties | | ROTOMAX ™ Blue | Ink 1 |
|---|---|---|---|
| Crinkle resistance | | Standard | Equal |
| 610 Tape resistance | | Standard | Equal |
| Scratch resistance | | Standard | Slightly worse |
| Resolubility | | Standard | Better |
| Extrusion bond (g/inch) | 48LBT* | 32 | 20 |
| | 50M30** | 160 | 237 |
| | T523* | 18 | 127 |
| Adhesive bond (g/inch) | 48LBT* | 723 | 42 |
| | 50M30** | 797 | 137 |
| | T523*** | 448 | 190 |

TABLE 3-continued

Comparison of Ink 1 with Commercial ROTOMAX ™ Blue (Solvent-based Gravure Laminating Ink)

| Properties | ROTOMAX ™ Blue | Ink 1 |
|---|---|---|
| Gloss | 45.8 | 80.8 |
| Color Strength | 100% Standard | 127% |
| Transparency | Standard | Much better |

*corona-treated polyester;
**PVDC-coated polyester;
***corona-treated polypropylene
ROTOMAX ™ blue: solvent-based gravure laminating ink based on a polyurethane and Phthalo blue pigment 15:4, Sun Chemical Corporation.

TABLE 4

Comparison of Ink 2 with Commercial DPF426 ™ Blue (Water-based Flexo Laminating Ink)

| Properties | | DPF426 ™ Blue | Ink 2 |
|---|---|---|---|
| Water resistance | | Standard | Equal |
| Crinkle resistance | | Standard | Equal |
| 610 Tape resistance | | Standard | Equal |
| Scratch resistance | | Standard | Equal |
| Resolubility | | Standard | Better |
| Extrusion bond (g/inch) | T523* | 150 | 130 |
| | LBW* | 235 | 250 |
| Extrusion bond (g/inch) | T523* | 350 | 265 |
| | LBW* | 307 | 320 |
| Gloss | | 50.6 | 92.0 |
| Color Strength | | 100% Standard | 139.0% |
| Transparency | | Standard | Much better |

*corona-treated Polypropylene films
DPF426 ™ blue: water-based flexo laminating ink based on an acrylic resin and Phthalo pigment blue 15:3, Sun Chemical Corporation.

TABLE 5

Comparison of Ink 3 with Commercial SUNTEX ™ Blue (Solvent-based Surface Flexo Ink)

| Properties | SUNTEX ™ Blue | Ink 3 |
|---|---|---|
| Water resistance | Standard | Equal |
| Crinkle resistance | Standard | Equal |
| 610 Tape resistance | Standard | Slightly worse |
| Scratch resistance | Standard | Equal |
| Resolubility | Standard | Equal |
| Gloss | 73.1 | 80.6 |
| Color Strength | 100% Standard | 105.8% |
| Transparency | Standard | Equal |

*Film T-523 corona treated Polypropylene
SUNTEX ™ blue: solvent-based flexo surface ink based on a polyamide and Phthalo blue pigment 15:4, Sun Chemical Corporation.

TABLE 6

Comparison of Ink 4 with Commercial HYDROPOLY ™ Blue (Water-based Surface Flexo Ink)

| Properties | HYDROPOLY ™ Blue | Ink 4 |
|---|---|---|
| Water resistance | Standard | Equal |
| Ammonia resistance | Standard | Worse |

TABLE 6-continued

Comparison of Ink 4 with Commercial HYDROPOLY ™ Blue
(Water-based Surface Flexo Ink)

| Properties | HYDROPOLY ™ Blue | Ink 4 |
|---|---|---|
| Crinkle resistance | Standard | Equal |
| 610 Tape resistance | Standard | Equal |
| Scratch resistance | Standard | Equal |
| Resolubility | Standard | Better |
| Gloss | 63.3 | 79.5 |
| Color Strength | 100% Standard | 114% |
| Transparency | Standard | Better |

* Film T-523 corona treated Polypropylene
HYDROPOLY ™ blue: water-based flexo surface ink based on an acrylic resin and blue pigment 15:3, Sun Chemical Corporation.

TABLE 7

Comparison of Ink 5 with ROTOMAX ™ Blue
(Solvent-based Gravure Laminating Ink)

| Properties | | ROTOMAX ™ Blue | Ink 5 |
|---|---|---|---|
| Crinkle resistance | | Standard | Equal |
| 610 Tape resistance | | Standard | Equal |
| Resolubility | | Standard | Better |
| Extrusion | 48LBT* | 140 | 320 |
| bond | M813** | 110 | 130 |
| (g/inch) | T523*** | 40 | 20 |
| Adhesive | 48LBT* | 450 | 390 |
| bond | M813* | 500 | 230 |
| (g/inch) | T523*** | 250 | 320 |
| Gloss | | 51.2 | 82.3 |
| Color Strength | | 100% Standard | 130% |
| Transparency | | Standard | Better |

*corona-treated polyester;
**chemically treated polyester;
***corona-treated polypropylene
ROTOMAX ™ blue: solvent-based gravure laminating ink based on a polyurethane and Phthalo blue pigment 15:4; Sun Chemical Corporation.

TABLE 8

Comparison of Ink 6 with ULTRABOND ™ blue
(Solvent-based Flexo Laminating Ink)

| Properties | | ULTRABOND ™ | Ink 6 |
|---|---|---|---|
| Crinkle resistance | | Standard | Equal |
| 610 Tape resistance | | Standard | Equal |
| Resolubility | | Standard | Equal |
| Extrusion | 48LBT* | 50 | 50 |
| bond | M813** | 0 | 50 |
| (g/inch) | T523* | 50 | 100 |
| Adhesive | 48LBT* | 250 | 250 |
| bond | M813* | 0 | 150 |
| (g/inch) | T523** | Film tear | Film tear |
| Gloss | | 78.4 | 85.3 |
| Color Strength | | 100% Standard | 98% |
| Transparency | | Standard | Better |

*corona-treated polyester;
**chemically treated polyester;
***corona-treated polypropylene
ULTRABOND ™ blue: solvent-based gravure laminating ink based on a polyamide and Phthalo blue pigment 15:4, Sun Chemical Corporation.

TABLE 9

Comparison of Ink 7 with ROTOMAX ™ Red
(Solvent-based Gravure Laminating Ink)

| Properties | | ROTOMAX ™ | Ink 7 |
|---|---|---|---|
| Crinkle resistance | | Standard | Equal |
| 610 Tape resistance | | Standard | Equal |
| Resolubility | | Standard | Equal |
| Extrusion | 48LBT* | 15 | 70 |
| bond | M813** | 25 | 35 |
| (g/inch) | T523* | 25 | 70 |
| Adhesive | 48LBT* | 370 | 520 |
| bond | M813* | 430 | 420 |
| (g/inch) | T523** | 350 | 340 |
| Gloss | | 53.1 | 91.2 |
| Color Strength | | 100% Standard | 126% |
| Transparency | | Standard | Much better |

*corona-treated polyester;
**chemically treated polyester;
***corona-treated polypropylene
ROTOMAX ™ Red: solvent-based gravure laminating ink based on a polyurethane and red pigment 52:1, Sun Chemical Corporation.

TABLE 10

Comparison of Ink 8 with ULTRABOND ™ Red
(Solvent-based flexo Laminating Ink)

| Properties | | ULTRABOND ™ | Ink 8 |
|---|---|---|---|
| Crinkle resistance | | Standard | Equal |
| 610 Tape resistance | | Standard | Equal |
| Resolubility | | Standard | Equal |
| Extrusion | 48LBT* | 120 | 50 |
| bond | M813** | 0 | 100 |
| (g/inch) | T523* | Film tear | Film tear |
| Adhesive | 48LBT* | Film tear | Film tear |
| bond | M813* | 50 | 150 |
| (g/inch) | T523** | Film tear | Film tear |
| Gloss | | 71.7 | 88.1 |
| Color Strength | | 100% Standard | 129% |
| Transparency | | Standard | Better |

*corona-treated polyester;
**chemically treated polyester;
***corona-treated polypropylene
ULTRABOND ™ blue: solvent-based flexo laminating ink based on a polyamide and red pigment 52:1, Sun Chemical Corporation.

Application of Universal Base in Ink Jet Application

The following jet ink based on the universal colorant was prepared using the following:

| | |
|---|---|
| Solventless colorant UB3 | 10.0 |
| Deionized water | 83.8 |
| Ammonia | 3.0 |
| Surfynol 465 | 0.2 |
| Tripropylene Glycol | 3.0 |
| | 100.0 |

This ink has very fine particle size and narrow size distribution comparable to a commercial blue jet ink, as shown in Table 11. The ink also exhibited excellent dispersion stability; no settlement was observed after the ink stands on the bench for over a month. The particle size and distribution did not change at all 7 days after the ink was put in the oven at 50° C., and no settlement was observed. The above ink was jetted with an Epson 440 ink jet printer (drop on-demand technology). An ink was also formulated with an commercial ink jet dispersion DIB-2001 (Dainippon Inks and Chemicals) and jetted with same machine. The jetted prints are comparable in terms of color strength and graphics quality.

TABLE 11

Particle Size and Distribution
UB Jet Ink vs. Commercial Jet Ink

|  | Mean Diameter | Standard Deviation |
| --- | --- | --- |
| UB3 Jet Ink | 0.15 | 0.06 |
| UB3 Jet Ink (7 days in oven at 50° C.) | 0.15 | 0.05 |
| DIC Commercial Jet Ink* | 0.15 | 0.05 |

*DIB 2001 ™ blue jet ink based on phthalo blue 15:3 pigment, Dainippon Inks & Chemicals (DIC).

The invention has been described in terms of preferred embodiments thereof, but is more broadly applicable as will be understood by those skilled in the art. The scope of the invention is only limited by the following claims.

What is claimed is:

1. A method of preparing a universal base composition comprising dispersing a pigment in a resin that is soluble in both water and organic solvent and wherein:
   (a) said resin comprises both hydrophobic and hydrophilic monomers;
   (b) the total weight of the hydrophobic and hydrophilic monomers is at least about 20% of the total weight of the resin; and
   (c) the weight ratio of hydrophobic monomers to hydrophilic monomers is from about 1/5 to about 5
wherein the resin is a polyurethane resin.

2. The method of claim 1, wherein the total weight of the hydrophobic and hydrophilic monomers is from about 25 to about 35% of the total weight of the resin.

3. The method of claim 1, wherein the weight ratio of hydrophobic monomers to hydrophilic monomers is from about 1/3 to about 3.

4. A method of preparing a universal base composition comprising dispersing a pigment in a resin that is soluble in both water and organic solvent and wherein:
   (a) said resin comprises both hydrophobic and hydrophilic monomers;
   (b) the total weight of the hydrophobic and hydrophilic monomers from about 40 to about 60% of the total weight of the resin; and
   (c) the weight ratio of hydrophobic monomers to hydrophilic monomers is from about 1/5 to about 5;
wherein the resin is a polyamide resin.

5. The method of claim 4, wherein the weight ratio hydrophobic to hydrophilic monomers is from about 1/3 to about 3.

6. A method of preparing a universal base composition comprising dispersing a pigment in a resin that is soluble in both water and organic solvent and wherein:
   (a) said resin comprises both hydrophobic and hydrophilic monomers;
   (b) the total weight of the hydrophobic and hydrophilic monomers from about 50 to about 70% of the total weight of the resin; and
   (c) the weight ratio of hydrophobic monomers to hydrophilic monomers is from about 1/5 to about 5;
wherein the resin is a polyester.

7. The method of claim 6 wherein the weight ratio of hydrophobic to hydrophilic monomers is from about 1/3 to about 3.

8. A method of preparing a universal base composition comprising dispersing a pigment in a resin that is soluble in both water and organic solvent and wherein:
   (a) said resin comprises both hydrophobic and hydrophilic monomers;
   (b) the total weight of the hydrophobic and hydrophilic monomers is at least about 20% of the total weight of the resin; and
   (c) the weight ratio of hydrophobic monomers to hydrophilic monomers is from about 1/5 to about 5;
wherein the resin is a copolymer urethane-amide or a copolymer urethane-ester.

9. The method of claim 1, wherein the resin has an acid number of about 0 to about 300.

10. The method of claim 8, wherein the resin has an acid number of about 30 to about 250.

11. The method of claim 1, wherein the resin has an amine value of about 0 to about 400.

12. The method of claim 11, wherein the resin has an amine value of about 150 to about 380.

13. The method of claim 1, wherein the molecular weight of the resin is from about 500 to about 1,000,000.

14. The method of claim 1, wherein the resin has a softening point of about 20° C. to about 200° C.

15. The method of claim 1, wherein dispersing the pigment is carried out in the presence of additives.

16. The method of claim 1, wherein the pigment is in presscake or dry color form.

17. The method of claim 1, wherein the pigment is about 10% to 80% by weight of the universal base composition.

18. A universal base composition prepared according to the method of claim 1.

19. A method of preparing an ink formulation or an ink dispersion comprising:
   (a) preparing a universal base composition by dispersing a pigment in resin that is soluble in both water and organic solvent wherein:
      (i) said resin comprises both hydrophobic and hydrophilic monomers;
      (ii) the total weight of the hydrophobic and hydrophilic monomers is at least about 20% of the total weight of the resin; and
      (iii) the weight ratio of hydrophobic monomers to hydrophilic monomers is from about 1/5 to about 5; and
   (b) dissolving the universal base composition into a water or organic solution.

20. The method of claim 19, wherein the ink formulation is suitable for laminating applications.

21. The method of claim 19, wherein the ink formulation is suitable for surface applications.

22. The method of claim 19, wherein the ink can be printed with flexographic, gravure, or ink jet processes.

23. An ink formulation prepared according to the method of claim 19.

24. An ink dispersion prepared according to the method of claim 19.

25. The method of claim 19, wherein the resin is selected from the group consisting of polyester, acrylic, polyurethane, polyamide, and copolymer resin thereof.

26. The method of claim 25, wherein the resin is polyurethane resin.

27. The method of claim 26, wherein the total weight of the hydrophobic and hydrophilic monomers is from about 25 to about 35% of the total weight of the resin.

28. The method of claim 26, wherein the weight ratio of hydrophobic monomers to hydrophilic monomers is from about ⅓ to about 3.

29. The method of claim 25, wherein the resin is a polyamide resin.

30. The method of claim 29, wherein the total weight of the hydrophobic and hydrophilic monomers is from about 40 to about 60% of the total weight of the resin.

31. The method of claim 29, wherein the weight ratio of hydrophobic monomers to hydrophilic monomers is from about ⅓ to about 3.

32. The method of claim 25, wherein the resin is a polyester.

33. The method of claim 32, wherein the total weight of the hydrophobic and hydrophilic monomers is from about 50 to about 70% of the total weight of the resin.

34. The method of claim 32, wherein the weight ratio of hydrophobic monomers to hydrophilic monomers is from about ⅓ to about 3.

35. The method of claim 25, wherein the resin is an acrylic.

36. The method of claim 25, wherein the resin is a copolymer.

37. The method of claim 36, wherein the copolymer is a urethane-amide or a urethane-ester.

38. The method of claim 19, wherein the resin has an acid number of about 0 to about 300.

39. The method of claim 38, wherein the resin has an acid number of about 30 to about 250.

40. The method of claim 19, wherein the resin has an amine value of about 0 to about 400.

41. The method of claim 40, wherein the resin has an amine value of about 150 to about 380.

42. The method of claim 19, wherein the molecular weight of the resin is from about 500 to about 1,000,000.

43. The method of claim 19, wherein the resin has a softening point of about 20° C. to about 200° C.

44. The method of claim 19, wherein dispersing the pigment is carried out in the presence of additives.

45. The method of claim 19, wherein the pigment is in presscake or dry color form.

46. The method of claim 19, wherein the pigment is about 10 to 80% by weight of the universal base composition.

47. The method of claim 4, wherein the resin has an acid number of about 0 to about 300.

48. The method of claim 4, wherein the resin has an amine value of about 0 to about 400.

49. The method of claim 48, wherein the resin has an amine value of about 150 to about 380.

50. The method of claim 4, wherein the molecular weight of the resin is from about 500 to about 1,000,000.

51. The method of claim 4, wherein the resin has a softening point of about 20° C. to about 200° C.

52. The method of claim 4, wherein dispersing the pigment is carried out in the presence of additives.

53. The method of claim 4, wherein the pigment is in presscake or dry color form.

54. The method of claim 4, wherein the pigment is about 10% to 80% by weight of the universal base composition.

55. A universal base composition prepared according to the method of claim 4.

56. The method of claim 6, wherein the resin has an acid number of about 0 to about 300.

57. The method of claim 6, wherein the resin has an amine value of about 0 to about 400.

58. The method of claim 57, wherein the resin has an amine value of about 150 to about 380.

59. The method of claim 6, wherein the molecular weight of the resin is from about 500 to about 1,000,000.

60. The method of claim 6, wherein the resin has a softening point of about 20° C. to about 200° C.

61. The method of claim 6, wherein dispersing the pigment is carried out in the presence of additives.

62. The method of claim 6, wherein the pigment is in presscake or dry color form.

63. The method of claim 6, wherein the pigment is about 10% to 80% by weight of the universal base composition.

64. A universal base composition prepared according to the method of claim 6.

* * * * *